United States Patent
Kogelman et al.

(10) Patent No.: US 11,573,772 B2
(45) Date of Patent: Feb. 7, 2023

(54) MECHANISM FOR INFORMATION PROPAGATION AND RESOLUTION IN GRAPH-BASED PROGRAMMING LANGUAGES

(71) Applicant: Electronic Arts Inc., Redwood City, CA (US)

(72) Inventors: Jean-Paul Alexander Kogelman, Vancouver (CA); Kurtis Michael Schmidt, Port Moody (CA)

(73) Assignee: Electronic Arts Inc., Redwood City, CA (US)

(*) Notice: Subject to any disclaimer, the term of this patent is extended or adjusted under 35 U.S.C. 154(b) by 83 days.

(21) Appl. No.: 17/017,328

(22) Filed: Sep. 10, 2020

(65) Prior Publication Data

US 2022/0075602 A1 Mar. 10, 2022

(51) Int. Cl.
  *G06F 9/44* (2018.01)
  *G06F 8/34* (2018.01)
  *G06F 16/901* (2019.01)
  *G06F 8/33* (2018.01)
  *G06F 8/30* (2018.01)

(52) U.S. Cl.
  CPC .............. *G06F 8/34* (2013.01); *G06F 8/31* (2013.01); *G06F 8/33* (2013.01); *G06F 16/9024* (2019.01)

(58) Field of Classification Search
  None
  See application file for complete search history.

(56) References Cited

U.S. PATENT DOCUMENTS

| | | | |
|---|---|---|---|
| 11,068,286 B2* | 7/2021 | Gupta | G06F 16/24 |
| 11,106,347 B1* | 8/2021 | Bond | G06F 3/04847 |
| 2005/0283675 A1* | 12/2005 | Krebs | G06F 9/453 |
| | | | 714/38.1 |
| 2010/0036665 A1* | 2/2010 | Bess | G06F 8/38 |
| | | | 704/E15.001 |
| 2012/0174078 A1* | 7/2012 | Xu | G06F 12/0875 |
| | | | 717/131 |
| 2016/0305819 A1* | 10/2016 | Lian | G01J 1/0219 |
| 2017/0139406 A1* | 5/2017 | Seidner | G06F 30/30 |
| 2019/0272148 A1* | 9/2019 | Chang | H04W 88/02 |
| 2020/0211281 A1* | 7/2020 | Randon | G06T 17/205 |
| 2021/0286813 A1* | 9/2021 | Pfitzmann | G06Q 30/0201 |

* cited by examiner

*Primary Examiner* — Anna C Deng
(74) *Attorney, Agent, or Firm* — Lee & Hayes, P.C.; Bea Koempel-Thomas

(57) ABSTRACT

A visual-programming tool processes nodes of a graph corresponding to operations or functions in program code associated with a plurality of programs, (e.g., games), stored as graph of nodes with logical connections signifying inputs, outputs, and/or units of connected nodes. The visual-programming tool resolves valid types and/or units associated with respective connected nodes and can propagate valid types and/or units throughout the graph.

20 Claims, 7 Drawing Sheets

MECHANISM FOR INFORMATION PROPAGATION AND RESOLUTION IN GRAPH-BASED PROGRAMMING LANGUAGES

BACKGROUND

Visual programming is a method of programming allowing programmers to program using graphical elements rather than text. Visual programming may be useful for users with or without a programming background. Visual programming can include graphical elements, called "nodes," which the programmer can connect together to create a control flow or process. In some cases, a node performs a function and has inputs and outputs (also called "ports"). A simple example is an "Add" node, which can be a node that accepts as input two or more values, performs the function of adding them together, and provides as output the sum of the two or more values. Traditionally in visual programming, when a programmer assigns a type to a node, the node's inputs and an outputs are of classic programming types like int, float, string, bool, etc.

Often programmers will copy and paste existing nodes when creating a new program, and that often introduces errors in conventional visual-programming environments. For example, when creating a new add, the user will copy and paste an existing add.float, an existing add.int, etc., and the programmer will need to create a new add for every applicable type version that was not part of the copied node. This approach requires extensive manual set up and also requires that the programmers know the details of the underlying programming of the node. In conventional visual programming, if a later programmer wants to change an input or output type from a float to an int, for example, the programmer has to modify the existing add.float or delete it and add the add.int version of the node, and has to reconnect (and possibly modify) all of the nodes connecting to the add node to reflect the change in type.

In some instances, programmers may desire a "typeless node" that does not have type defined inputs or output, i.e., a port of the node could accept any type. Typeless nodes can provide a flexibility advantage to the programmer, but the inputs and outputs of typeless nodes must eventually resolve for the program to build. Traditionally, the ports of a typeless node inherited their type from the node being connected to it. For example, if an output port of a first node connected to the input port of a typeless node output a string, the input port for the typeless node would resolve to a string. But, this can present a problem when one typeless node is connected to another typeless node, as there is no type to be inherited and the nodes cannot resolve. Over the course of designing a program, a collection of these issues can create an $N^2$ problem, which can slow program development rather than accelerate it as desired.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
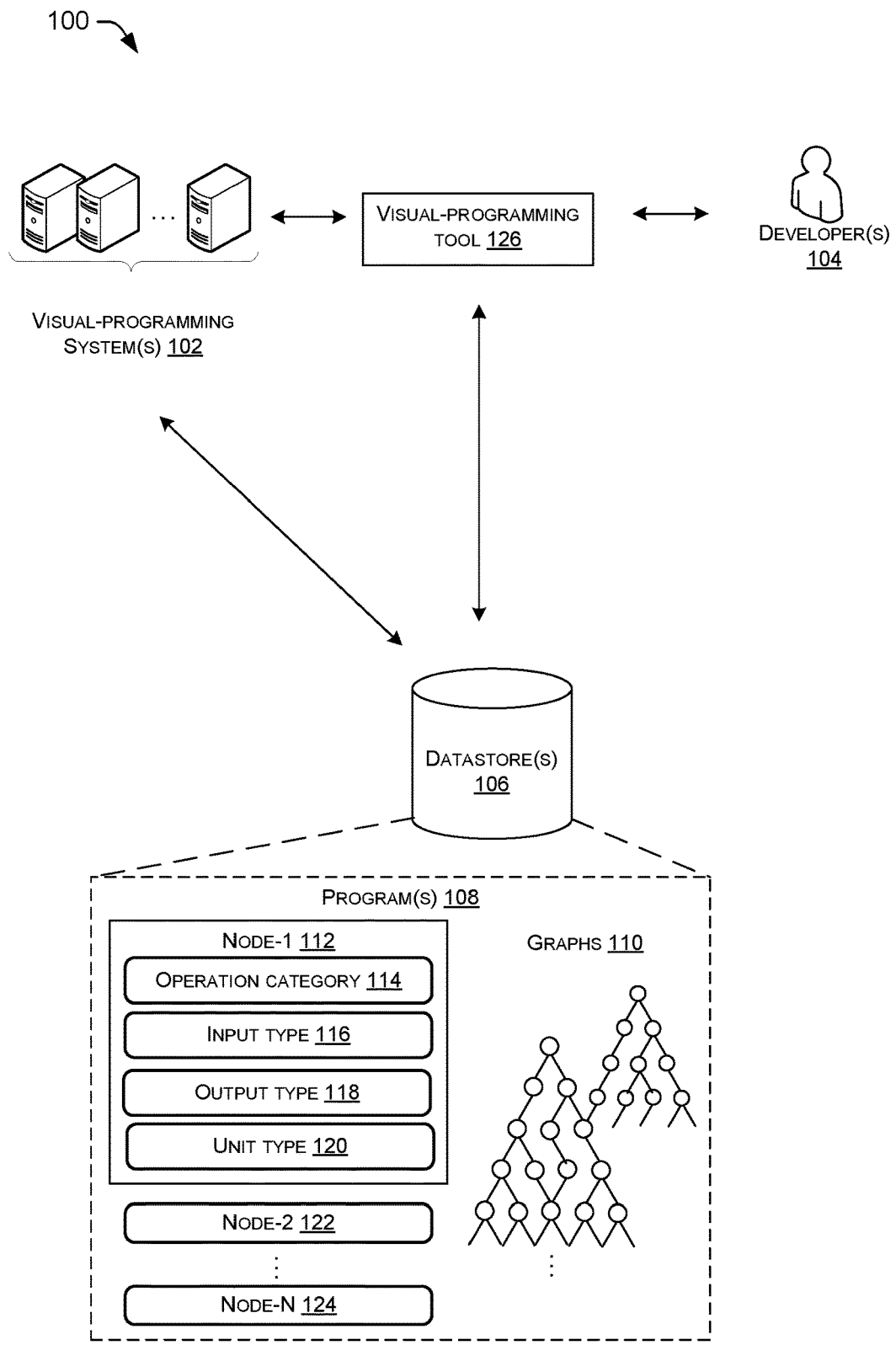
FIG. 1 illustrates an example operating environment for a mechanism to propagate and resolve information in graph-based programming languages in accordance with examples described herein.

Examples in this disclosure describe techniques and mechanisms, e.g., methods, apparatuses, computer-readable media, and/or systems, for information propagation and resolution in graph-based programming. Such information propagation and resolution can be used for visual programming of video games in a visual-programming runtime or tool as well as other programming. For example, the graph-based programming system described herein can improve development speed for games in development, whether they are brand new, updates, or extensions. Users who may have limited programming experience, such as video game designers for example, can use a mechanism to propagate and resolve information in graph-based programming languages as described herein to expedite program development and to reduce debugging time compared to traditional textual programming or current graph-based visual-programming tools. While the example embodiments described herein generally refer to visual programming of video games, the disclosed techniques and mechanisms can apply to other visual programming environments.

In addition to reducing the time spent on initial program development and coding, reducing time spent identifying and correcting errors in program code can improve the time-consuming tasks of debugging, verifying, and validating the program code. Use of conventional graph-based programming tools has become widespread in part because they can help eliminate errors that typically occur in textual programming like misspelled identifiers and operators. Conventional graph-based programming tools can also help avoid errors in programming logic, but to date their usefulness in this realm has been limited because they have been too inflexible for several reasons. For example, conventional graph-based programming tools do not resolve errors introduced from users copying and pasting existing nodes. As another example, conventional graph-based programming tools cannot resolve or automatically determine a type for a typeless node connected to another typeless node such that there is not a type to be inherited from the node being connected. Moreover, conventional graph-based programming tools can introduce code bloat if a programmer copies a node written to handle multiple input/output types, even if not all types are used by the graph. Furthermore, to the extent that conventional graph-based programming tools attempt to address these problems, they do not do so efficiently enough for the conventional graph-based programming tools to be run while the programmer is working in the visual-programming environment. Reducing the time it takes programmers or developers to produce robust code with less errors via an extensible visual-programming language mechanism, that facilitates typeless nodes that propagate and resolve types, units, etc. automatically and correctly through any number of connected nodes, is therefore desirable.

The mechanism to propagate and resolve information in graph-based programming that is described herein can employ propagation and resolution in an intuitive visual-programming graphical-user interface. As an example, the graph-based visual-programming tool can provide for design or entry of graph-based code without requiring deep programming proficiency. Such graph-based code can include graph-based instructions using a node and edge syntax that can form a directed graph of operations. The nodes can represent functions or operations. For example, one or more of the nodes can be a native function call node of the graph-based programming language (e.g., add, multiply, sine, cosine, tangent, etc.). The edges between nodes can represent data flows (e.g., input and output of variables or values) and/or control between nodes flows (e.g., to provide a direction to a directed graph).

The graph-based visual-programming tool that is described herein is extensible for a variety of programs, (e.g., including games, etc.). The graph-based visual-programming tool that is described herein employs one or more hierarchies and/or algorithms that can provide programming code for the visual-programming environment. The graph-based visual-programming tool that is described herein can employ the hierarchies and/or algorithms to improve the programmers/developers' workflow so that programmers/ developers need not concern themselves with the type or units of an operation they are adding to the programming canvas. The programmers/developers can simply place a typeless node of a desired operation category, e.g., a new add operation, a new multiply operation, etc., and the programmer/developer need not consider the possible versions of the new operation.

The graph-based visual-programming tool described herein is simpler and faster for programmers/developers because it does not require that the programmer/developer know the details for each version of an operation, nor does it require that the user manually make changes throughout the graph when type changes are made. Operations belong to operation categories, and the programmer/developer need only select the desired category. For illustration, the following is an excerpt of an example list of versions or types of the Add operation category.

Add.float
Add.int
Add.long
Add.uint
Add.ulong
Add.float2
Add.float3
Add.float4
Add.quaternion
Add.float3×3
Add.float4×4
Add.double
Add.linear_transform For example, the programmer/developer revising a node from an Add.float to an Add.int, can cause some parameters to be deleted, the correct version to be added, and the connections (edges) to be remade, without needing to manually make those changes or even to know that those changes are being made. The graph-based visual-programming tool can automatically resolve those details and propagate them throughout the graph. In contrast, conventionally, errors were often introduced in each of these actions and when seeking to optimize the code. For example, addition of a typeless node that can take a float, an int, a bool, etc. on the same port may have been desired. Based on the connected nodes, the programmer/developer would have to decide the port to use. The conventional approaches did not work because each node accepted connections based on an assumption that the connecting node was limited a single concrete type. However, when connecting one typeless node to another, the nodes could not resolve the type. In situations where there was more than one valid type in the connected node, the typeless node would end up in an unresolvable state. The graph-based visual-programming tool that is described herein does not rely on type inheritance from a connected node, and it can resolve types for typeless nodes connected to each other according to example processes described herein.

The graph-based visual-programming tool described herein can resolve a graph having typeless nodes to the correct combination of inputs and outputs automatically by using a single operation node per category, also termed a typeless node, that supports each possible valid combination. For example, an Add node can be typeless. That means that the Add node can support Add.int, Add.float, Add.double, Add.linear_transform, etc. The resolution is recursive through any number of connected nodes and/or subgraphs. The correct combination of inputs and outputs can automatically propagate through to connected generic function calls and reduce the entire graph to its lowest state and/or to correct type. This provides a more efficient environment for the programmer/developer to generate code from that graph or expression script. Using the visual-programming system described herein, programmers/developers can build graphs based on operation categories without concern for node types, and the nodes can be resolved later. In some cases, resolution can be postponed until run time.

In an example, a graph-based mechanism in the visual programming tool can identify a first node of a graph having two ports, port A and port B. In this example, type states for the first node can be represented by [A=type1, B=type2] and [A=type3, B=type3]. In this example, the graph-based mechanism in the visual programming tool can identify a second node of a graph having two ports, port C and port D. In this example, type states for the second node can be represented by [C=type2, D=type1] and [C=type1, D=type2]. In this example, the graph-based mechanism in the visual programming tool can identify an edge between these nodes connecting ports B and C. In this example, the graph-based mechanism in the visual programming tool can resolve the edge by identifying valid types associated with the first node port B as first types (type2, type3), by identifying valid types associated with the second node port C as second types (type2, type1), and identify as reduced edge types the intersection of the first types and the second types (type2). In this example, the graph-based mechanism in the visual programming tool can store first node type state(s) where the port B type is identified in the reduced edge types; in other words, where the port B type is type2 in this example, which means the graph-based mechanism would store the type state for the first node represented by

[A=type1, B=type2] and remove the type state for the first node represented by [A=type3, B=type3]. In this example, the graph-based mechanism in the visual programming tool can store second node type state(s) where the port C type is identified in the reduced edge types; in other words, where the port C type is type2 in this example, which means the graph-based mechanism would store the type state for the second node represented by [C=type2, D=type1] and remove the type state for the second node represented by [C=type1, D=type2]. In this example, type1 can represent an int, type2 can represent a float, and type3 can represent a bool; many more types and any combination of types are supported.

In some examples, a graph-based mechanism in the visual programming tool can leverage a registry of the nodes in the visual-programming system. The nodes can be grouped based on a user-specified group tag and/or on the node name. The visual-programming system can connect one or more nodes associated with a particular operation type to one or more other nodes that share the associated operation type. The visual-programming system can perform an intersect on the types of ports that are being connected. If there is a mismatch, in other words, if there are types in either list that are not included in the intersect, the visual-programming system can resolve to limit to those types in the intersection so that only compatible types are available. Through recursive intersections of the lists of types, the types reduce to a single element, and the graph reduces to its concrete implementation.

In at least one example, programming in the visual-programming system can be optimized by running the mechanism over a list of all of the connections in the graph, reducing each connection of each node. When the number of elements in either of the two nodes being compared is reduced, that node is added to the next list. This causes the node and all of connections to it to be rechecked on the next iteration. In at least one example, once all nodes have been processed once, processing starts again at the beginning using the now-reduced type combinations. The process repeats until all of the nodes in the graph have reached a state where their type combinations do not reduce further. In some examples, this process can be used to propagate information through the visual-programming system, such as to pass information about the units of ports, e.g., whether a particular float is a scalar or an angle. In some examples, rather than processing the graph in an ordered fashion and starting again at the beginning with reduced type combinations, the mechanism can perform an iterative solve of the graph. For example, the mechanism can process the list of connections in the graph in an unordered fashion and based on a connection between nodes, perform an intersect to reduce the combination of inputs that are valid. In this example, the processing goes back and forth through the lists of connections until all ports report that they have not entered a lower state.

FIG. 1 illustrates an example operating environment 100 for a mechanism to propagate and resolve information in graph-based programming languages in accordance with examples described herein.

The example environment 100 includes one or more visual-programming system(s) 102 that can be used by one or more programmers/developer(s) 104 to create development program code. Examples include games and/or other programs in development, whether the games and/or other programs in development are brand new games and/or other programs, updates to existing games, and/or new versions of existing games and/or other programs. Visual-programming system(s) 102 has one or more associated datastore(s). The datastore(s) 106 store datasets that programmers/developers 104 can access to develop and/or improve video games and/or other programs using a graph-based visual-programming tool 126 associated with the visual-programming system(s) 102 and/or the datastore(s) 106. A mechanism incorporated in visual-programming tool 126 can propagate and resolve information in graph-based programming languages associated with the visual-programming system(s) 102.

According to some examples, datastore(s) 106 can store a variety of programs 108 including games or other programs, which can be represented as graphs 110. These graphs 110 can visually correspond to backend code. Various types of graphs can by represented by graphs 110 including those known from graph theory such as finite and infinite graphs, and/or directed graphs, etc. Properties of the types of graphs can be employed by the mechanism described herein to propagate and resolve information in graph-based programming languages, which can improve programmer/developer workflow compared to previous solutions. The illustrated example program 108 includes node-1 112. As shown, node-1 112 includes a variety of associated attributes such as operation category 114, input type 116, output type 118, and in some instances, unit type 120, though these are but a few examples. An operation category 114 can represent any nodes that can perform similar operations, functions, or processes, but may accept different input/output combinations, and/or have different types for inputs and/or outputs. For example, the Add operation category corresponds to the variety of addition operations associated with inputs of different types, e.g., float, int, double, linear_transform, etc. In the illustrated example, node-1 112 can correspond to a vertex in one or more of the graphs 110. Although their details are omitted for brevity, any number of games or other programs can be included in program(s) 108 including node-2 122 through node-n 124, which can each have associated attributes like those shown for node-1 112.

Programmers/developers 104 can use a mechanism to propagate and resolve information in graph-based programming languages in a graph-based visual-programming tool 126 associated with visual-programming system(s) 102 to automatically resolve types associated with nodes of graphs 110 via a visual-programming graphical-user interface, which can vastly simplify the workflow of visual programming. In some examples, type resolution for one or more sections of a graph (subgraphs) can be deferred until a particular subgraph is used. For example, when the subgraph receives integer values as input, the subgraph is resolved to used integer operations.

Figure 2:
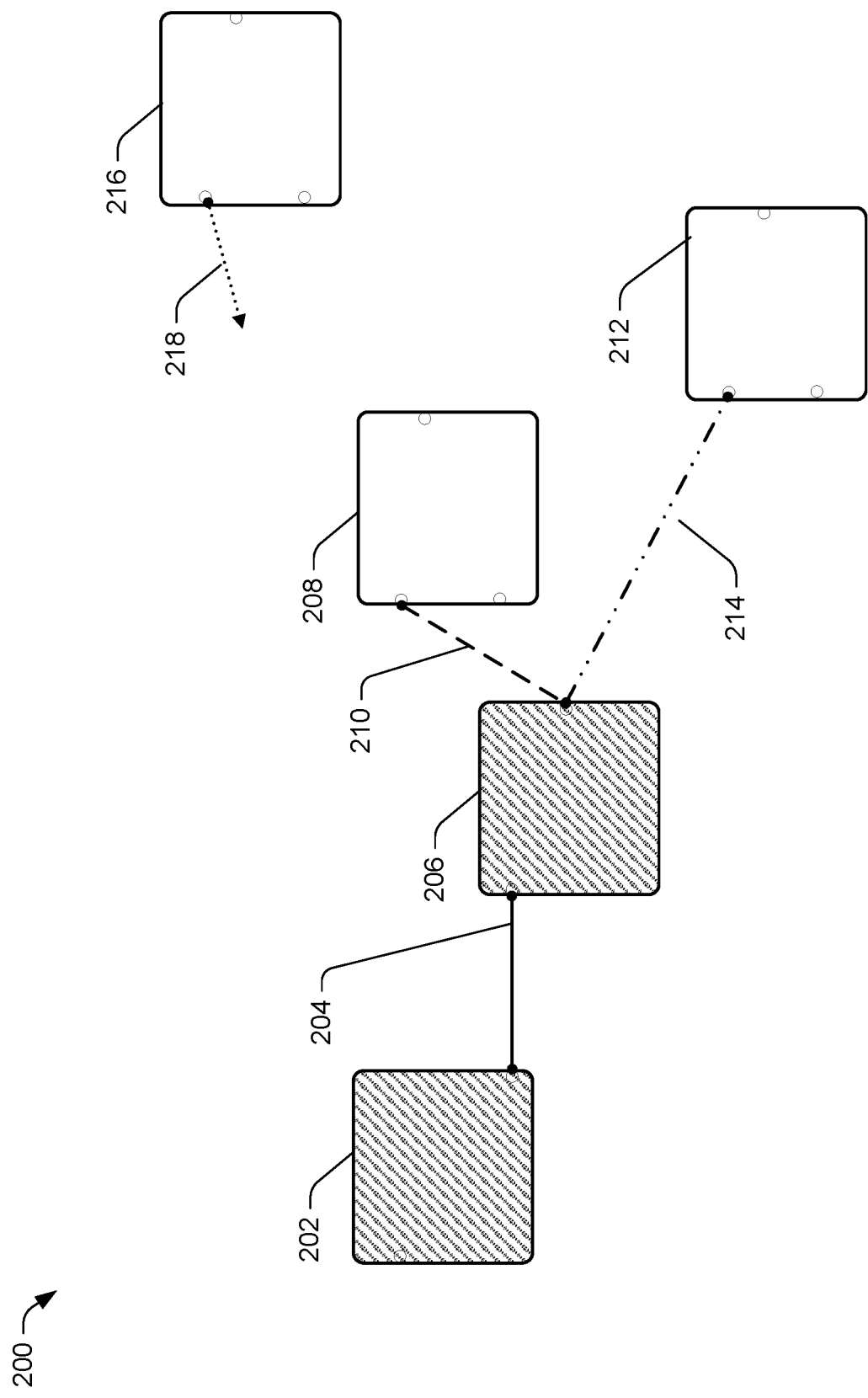
FIG. 2 illustrates an example graphical-user interface of a graph-based visual-programming tool incorporating a mechanism to propagate and resolve information in graph-based programming languages as described herein.

FIG. 2 illustrates an example graphical-user interface 200 associated with a graph-based visual-programming tool such as visual-programming tool 126 incorporating a mechanism to propagate and resolve information in graph-based programming languages as described herein.

In the illustrated example, blocks represent operation categories provided corresponding to some nodes in a graph, such as from graphs 110. The connecting lines, edges or links between the nodes, represent inputs and outputs from the respective operations. Of course, the operations shown are used as an example herein for explanation purposes and the usage of the disclosed systems and methods on other functions, operations, programs and so on is contemplated and within the scope of this disclosure.

As illustrated, the graph-based code includes a plurality of nodes and lines 202 to 218. In the illustrated example, node 202 has connections 204, that connects to node 206. The pattern of nodes 202 and 206 and the solid presentation of connection 204 indicated that the code associated with nodes 202 and 206 is valid. That is, the output of the operations associated with node 202 is a valid type to serve as input to the operation associated with node 206, which in this case represents a Tan h operation category with an input port designated Angle and an output port designated Tan h.

In examples, a user can interact with the input interface, e.g., by an interaction such as hovering, right clicking, key combinations, etc. over the operation block or a part of the operation block, such as the output port, to cause the interface to provide a list of types that are valid for the operation. In this example, hovering over the Tan h port causes a list of output types to be shown such as double, float, vector2, vector3, vector4. Notably, other types could generally be valid for a tangent operation, such as transforms, but in this case no transform is provided, which indicates that the tangent operation represented by node 206 will not produce a transform as output. Thus, this demonstrates type propagation of a subset of outputs for the tangent operation, though it is not down to a concrete type yet. Since the node 206 has a subset of available types and is not actively undergoing type reduction, node 206 can be considered to be at a stable state.

A user can cause additional nodes to be added via the input interface. In the illustrated example, node 208 has been added, and the connection has been made for the output of node 206 to be an input to node 208. Connecting line 210, which connects node 206 and node 208, shows that each output type(s) produced by node 206 is an available option for input to the operation category represented by node 208.

In the illustrated example, node 212 has also been added, and the connection has been made for the output of node 206 to be an input to node 212. Connecting line 214, which connects node 206 and node 212, shows that one or more, but not all, of the output type(s) produced by node 206 is an available option for input to the operation category represented by node 212. Since not all of the types are valid connecting line 214 is presented with a different pattern than line 210. In various examples, the different lines can be presented with different color, weight, etc. rather than or in addition to a different pattern to indicate a potential to limit types.

Meanwhile, in the illustrated example, node 216 has also been added, but a connection has not been made for the output of node 208 to be an input to node 216. Connecting line 218, which connects to an input port of node 216, which is shown with a different pattern than line 210 or line 214, will not connect to node 208, which shows that none of the output type(s) produced by node 208 is an available option for input to the operation category represented by node 216.

In the illustrated example, node 208 represents an add operation. Since linear transform is not a valid output from the tangent operation of node 206, linear transform is not a valid input for add node 208. This shows how type resolution works since linear transform could have otherwise been a valid input to an add operation as defined in the registry. Meanwhile, if a float were input to the second input port of add node 208, that would be propagated back through the graph via the connected Tan h node. The valid types are reduced throughout the graph, not just node to node, which is how the propagation works. Operations of the same category are grouped together in the registry so that the user does not need to define which operation they intend to use. For example, the user can just make an add, without needing to specify whether it is to add integer, float, linear transform, etc.

Figure 3:
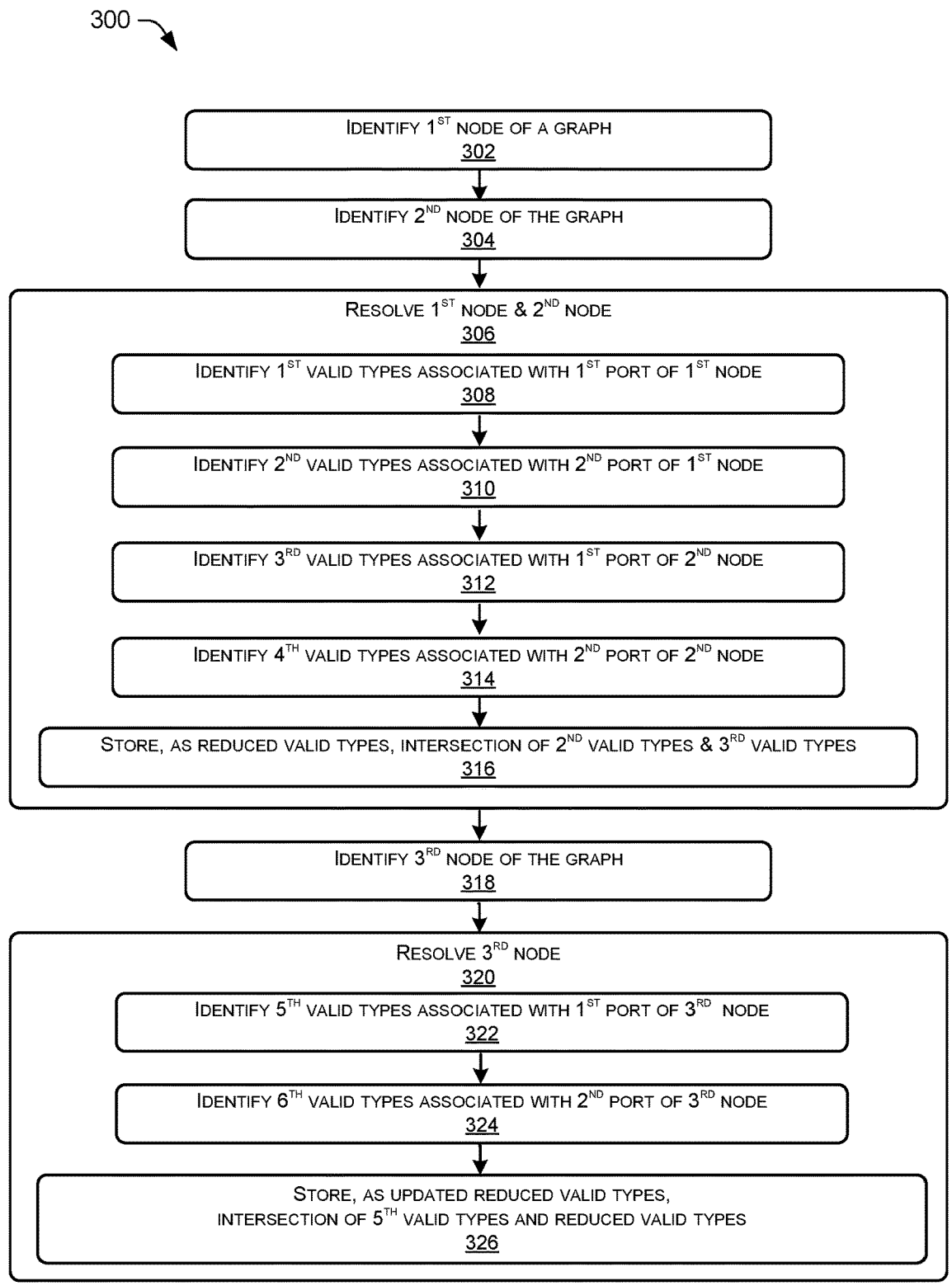
FIG. 3 illustrates a flow diagram of an example method of propagating and resolving information in graph-based programming languages as described herein.

FIG. 3 illustrates a flow diagram 300 of an example method of propagating and resolving information in graph-based programming languages as described herein.

At block 302, a mechanism associated with a graph-based visual-programming tool, such as visual-programming tool 126 associated with the visual-programming system 102, can identify a first node of a graph in a visual-programming environment. For example, the graph-based visual-programming tool 126 can identify node 202.

At block 304, the mechanism associated with the graph-based visual-programming tool, such as visual-programming tool 126 associated with the visual-programming system 102, can identify a second node of the graph in the visual-programming environment. For example, the graph-based visual-programming tool can identify node 206.

At block 306, the mechanism associated with the graph-based visual-programming tool, such as visual-programming tool 126 associated with the visual-programming system 102, can resolve an edge associated with the first node and the second node. For example, the graph-based visual-programming tool can resolve the types and/or units associated with ports of nodes 202 and 206 connected by edge 204. In an example where the graph shown in FIG. 2 is a directed graph, the mechanism associated with the graph-based visual-programming tool, such as visual-programming tool 126 associated with the visual-programming system 102, can resolve the input and output types and/or units associated with ports of nodes 202 and 206 and edge 204.

At block 308, the mechanism associated with the graph-based visual-programming tool, such as visual-programming tool 126 associated with the visual-programming system 102, can identify first valid types associated with a first port of the first node. In an example where the graph shown in FIG. 2 is a directed graph, the mechanism associated with the graph-based visual-programming tool, such as visual-programming tool 126 associated with the visual-programming system 102, can identify as first valid types, valid input types associated with the first node. For example, the mechanism can identify valid input types associated with node 202.

At block 310, the mechanism associated with the graph-based visual-programming tool, such as visual-programming tool 126 associated with the visual-programming system 102, can identify second valid types associated with a second port of the first node. In an example where the graph shown in FIG. 2 is a directed graph, mechanism associated with the graph-based visual-programming tool, such as visual-programming tool 126 associated with the visual-programming system 102, can identify as second valid types, valid output types associated with the first node. For example, the mechanism can identify valid output types associated with node 202.

At block 312, the mechanism associated with the graph-based visual-programming tool, such as visual-programming tool 126 associated with the visual-programming system 102, can identify third valid types associated with a first port of the second node. In an example where the graph shown in FIG. 2 is a directed graph, the mechanism associated with the graph-based visual-programming tool, such as visual-programming tool 126 associated with the visual-programming system 102, can identify as third valid types, valid input types associated with the second node. For example, the mechanism can identify valid input types associated with node 206.

At block 314, the mechanism associated with the graph-based visual-programming tool, such as visual-programming tool 126 associated with the visual-programming system 102, can identify fourth valid types associated with a second port of the second node. In an example where the graph shown in FIG. 2 is a directed graph, the mechanism associated with the graph-based visual-programming tool, such as visual-programming tool 126 associated with the visual-programming system 102, can identify as fourth valid types, valid output types associated with the second node. For example, the mechanism can identify valid output types associated with node 206.

At block 316, the mechanism associated with the graph-based visual-programming tool, such as visual-programming tool 126 associated with the visual-programming system 102, can cause the visual-programming tool 126 to store, such as in datastore 106, as reduced valid types, an intersection of the second valid types and the third valid types. The intersection corresponds to resolving edge 204. In an example where the graph shown in FIG. 2 is a directed graph, the mechanism associated with the graph-based visual-programming tool, such as visual-programming tool 126 associated with the visual-programming system 102, can cause visual-programming tool 126 to store, such as in datastore 106, as reduced valid types, an intersection of the valid output types of the first node and the valid input types of the second node.

At block 318, the mechanism associated with the graph-based visual-programming tool, such as visual-programming tool 126 associated with the visual-programming system 102, can identify a third node of the graph in the visual-programming environment. For example, the mechanism can identify node 208.

At block 320, the mechanism associated with the graph-based visual-programming tool, such as visual-programming tool 126 associated with the visual-programming system 102, can resolve an edge associated with the third node. For example, the mechanism can resolve the types and/or units associated with ports of node 208 with those of nodes 202 and 206 according to the connection of nodes 206 and 208 by edge 210. In an example where the graph shown in FIG. 2 is a directed graph, the mechanism can resolve the input and output types and/or units associated with ports of node 208 with those of nodes 202 and 206 and edge 210.

At block 322, the mechanism associated with the graph-based visual-programming tool, such as visual-programming tool 126 associated with the visual-programming system 102, can identify fifth valid types associated with a first port of the third node. In an example where the graph shown in FIG. 2 is a directed graph, the mechanism associated with the graph-based visual-programming tool, such as visual-programming tool 126 associated with the visual-programming system 102, can identify as fifth valid types, valid input types associated with the third node. For example, the mechanism can identify valid input types associated with node 208.

At block 324, the mechanism associated with the graph-based visual-programming tool, such as visual-programming tool 126 associated with the visual-programming system 102, can identify sixth valid types associated with a second port of the third node. In an example where the graph shown in FIG. 2 is a directed graph, the mechanism associated with the graph-based visual-programming tool, such as visual-programming tool 126 associated with the visual-programming system 102, can identify as sixth valid types, valid output types associated with the third node. For example, the mechanism can identify valid output types associated with node 208.

At block 326, the mechanism associated with the graph-based visual-programming tool, such as visual-programming tool 126 associated with the visual-programming system 102, can cause visual-programming tool 126 to store, such as in datastore 106, as updated reduced valid types, an intersection of the fifth valid types and the reduced valid types. The intersection corresponds to resolving edge 210. In an example where the graph shown in FIG. 2 is a directed graph, the mechanism associated with the graph-based visual-programming tool, such as visual-programming tool 126 associated with the visual-programming system 102, can cause visual-programming tool 126 to store, such as in datastore 106, as updated reduced valid types, an intersection of the valid input types of the third node and the reduced valid types.

Figure 4:
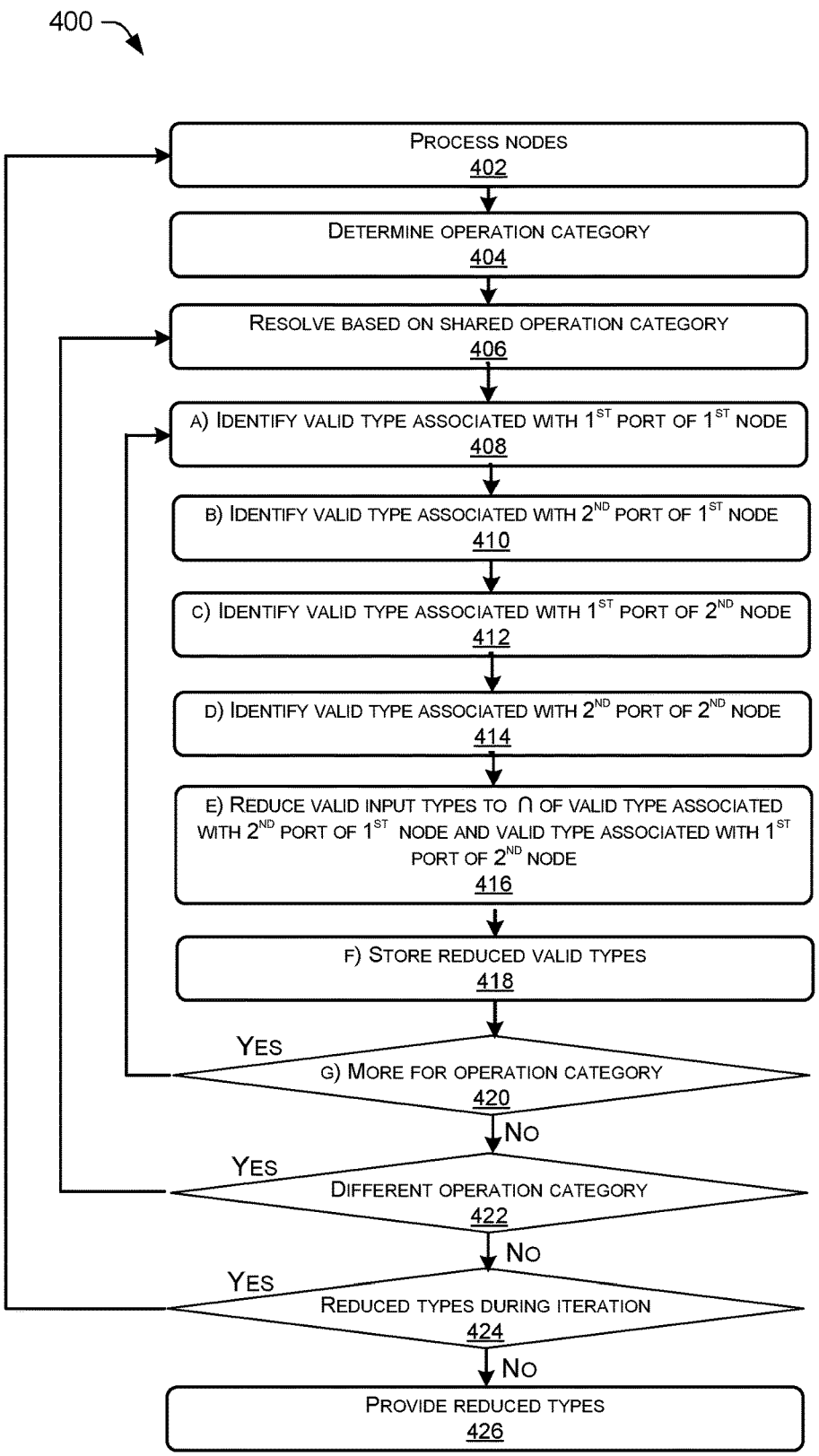
FIG. 4 illustrates a flow diagram of an example method of propagating and resolving information in graph-based programming languages as described herein.

FIG. 4 illustrates a flow diagram 400 of an example method of propagating and resolving information in graph-based programming languages as described herein.

At block 402, a mechanism associated with the graph-based visual-programming tool, such as visual-programming tool 126 associated with the visual-programming system 102, can begin processing nodes of a graph, which can be represented by nodes 112 from graphs 110. In some examples, the graph can be a directed graph.

At block 404, the mechanism associated with the graph-based visual-programming tool, such as visual-programming tool 126 associated with the visual-programming system 102, can determine an operation category associated with a first node in the graph. For example, the mechanism can identify the operation category associated with node-1 112, which, for illustration, can correspond to node 208.

At block 406, the mechanism associated with the graph-based visual-programming tool, such as visual-programming tool 126 associated with the visual-programming system 102, can begin to resolve the first node as part of a pair of nodes based on the pair of nodes being associated with a shared operation category. For example, the mechanism can begin to resolve the first node, node-1 112 (e.g., node 208) as part of a pair of nodes (with node-2 122 (e.g., node 212) based on the pair of nodes being associated with a shared operation category, e.g., the operation category Add.

At block 408, the mechanism associated with the graph-based visual-programming tool, such as visual-programming tool 126 associated with the visual-programming system 102, can identify valid type(s) associated with a first port of the first node. In an example where the graph is a directed graph, the mechanism associated with the graph-based visual-programming tool, such as visual-programming tool 126 associated with the visual-programming system 102, can identify valid type(s) of input associated with the first node. For example, the mechanism can identify valid input type(s) associated with node-1 112 (e.g., node 208).

At block 410, the mechanism associated with the graph-based visual-programming tool, such as visual-programming tool 126 associated with the visual-programming system 102, can identify valid type(s) associated with a second port of the first node. In an example where the graph is a directed graph, the mechanism associated with the graph-based visual-programming tool, such as visual-programming tool 126 associated with the visual-programming system 102, can identify valid type(s) of output associated with the first node. For example, the mechanism can identify valid output type(s) associated with node-1 112 (e.g., node 208).

At block 412, the mechanism associated with the graph-based visual-programming tool, such as visual-programming tool 126 associated with the visual-programming system 102, can identify valid type(s) associated with a first port of a second node. In an example where the graph is a directed graph, the mechanism associated with the graph-based visual-programming tool, such as visual-programming tool 126 associated with the visual-programming system 102, can identify valid type(s) of input associated with a second node. For example, the mechanism can identify valid input type(s) associated with node-2 122 (e.g., node 212).

At block 414, the mechanism associated with the graph-based visual-programming tool, such as visual-programming tool 126 associated with the visual-programming system 102, can identify valid type(s) associated with a second port of the second node. In an example where the graph is a directed graph, the mechanism associated with the graph-based visual-programming tool, such as visual-programming tool 126 associated with the visual-programming system 102, can identify valid types of output associated with the second node. For example, the mechanism can identify valid output types associated with node-2 122 (e.g., node 212).

At block 416, the mechanism associated with the graph-based visual-programming tool, such as visual-programming tool 126 associated with the visual-programming system 102, can reduce the valid type(s) to an intersection of the valid type(s) associated with the second port of the first node e.g., node-1 112 (e.g., node 208) and the valid type(s) associated with the first port of the second node e.g., node-2 112 (e.g., node 212). In an example where the graph is a directed graph, the mechanism associated with the graph-based visual-programming tool, such as visual-programming tool 126 associated with the visual-programming system 102, can reduce the valid types to an intersection of the valid types of output associated with the first node, e.g., node-1 112 (e.g., node 208) and the valid types of input associated with the second node, e.g., node-2 122 (e.g., node 212).

At block 418, the mechanism associated with the graph-based visual-programming tool, such as visual-programming tool 126 associated with the visual-programming system 102, can cause the visual-programming tool to store as reduced valid type(s) associated with each node of the pair of nodes, the valid type(s) included in the intersection of the valid type(s) from block 416, for example, in datastore 106. In examples, a visual-programming tool associated with visual-programming system 102 can store the reduced valid types in a list in datastore 106. In an example where the graph is a directed graph, a visual-programming tool associated with visual-programming system 102 can store the reduced valid types in a list of inputs, for example in datastore 106.

At block 420, the mechanism associated with the graph-based visual-programming tool, such as visual-programming tool 126 associated with the visual-programming system 102, can determine whether there are any additional nodes associated with the shared operation category, e.g., operation category Add, and repeat actions associated with blocks 408 to 418 when there are additional nodes associated with the shared operation category. For example, if node 216 is associated with the shared operation category, the mechanism can repeat actions associated with blocks 408 to 418 for node 216 as part of a pair of nodes.

At block 422, the mechanism associated with the graph-based visual-programming tool, such as visual-programming tool 126 associated with the visual-programming system 102, can determine whether there are any nodes in the graph associated with another operation category and repeat actions associated with blocks 406 to 420 when there is an additional operation category. For example, if node 216 is not associated with the shared operation category, the mechanism can repeat actions associated with blocks 406 to 420 for node 216 as part of a pair of nodes.

At block 424, the mechanism associated with the graph-based visual-programming tool, such as visual-programming tool 126 associated with the visual-programming system 102, can determine whether types reduced during the last iteration and repeat actions associated with blocks 402 to 422 when the types reduced. In examples, a mechanism associated with a graph-based visual-programming tool 126 associated with visual-programming system 102 can swap the reduced lists and repeat actions associated with blocks 402 to 422 on the reduced lists. In examples, when type associated with a node is reduced to a single concrete type, the mechanism can omit adding it to the list because the type cannot be reduced further.

At block 426, when the mechanism associated with the graph-based visual-programming tool, such as visual-programming tool 126 associated with the visual-programming system 102, determines the types did not reduce in the last iteration at block 424, the mechanism can provide a list of the reduced types associated with the graph.

In various examples, for graphs of thousands to tens of thousands of nodes, the list will reduce to a subset of a few nodes within milliseconds, e.g., 20 milliseconds or less, which is not humanly perceptible.

Figure 5:
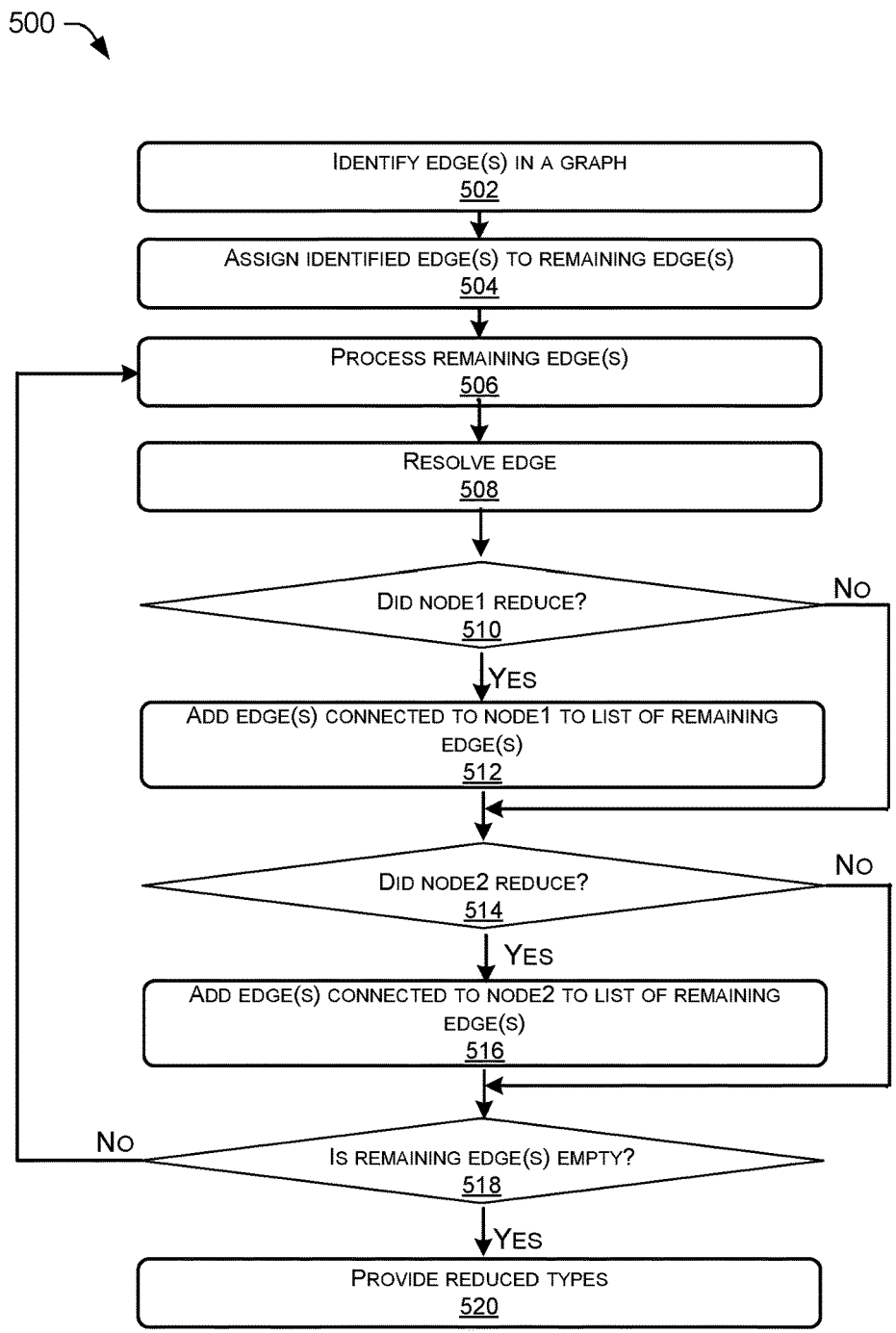
FIG. 5 illustrates a flow diagram of an example method of propagating and resolving information in graph-based programming languages as described herein.

FIG. 5 illustrates a flow diagram of an example method 500 of propagating and resolving information in graph-based programming languages as described herein.

At block 502, a mechanism associated with the graph-based visual-programming tool, such as visual-programming tool 126 associated with the visual-programming system 102, can begin processing edges connecting nodes of a graph, which can be represented by graph(s) 110, by identifying edge(s) in the graph. For example, the mechanism can identify edges 204, 210, and 214 from FIG. 2. In some examples, the graph can be a directed graph.

At block 504, the mechanism associated with the graph-based visual-programming tool, such as visual-programming tool 126 associated with the visual-programming system 102, can assign identified edge(s) to a list, or other container, of remaining edge(s). For example, the mechanism can assign edges 204, 210, and 214 from FIG. 2 to a list, or other container, of remaining edges corresponding to the graph shown in FIG. 2.

At block 506, the mechanism associated with the graph-based visual-programming tool, such as visual-programming tool 126 associated with the visual-programming system 102, can process the list, or other container, of remaining edge(s).

At block 508, the mechanism associated with the graph-based visual-programming tool, such as visual-programming tool 126 associated with the visual-programming system 102, can resolve an edge from the list, or other container, of remaining edge(s). For example, the mechanism can resolve edge 210. In at least one example, the mechanism associated with the graph-based visual-programming tool, such as visual-programming tool 126 associated with the visual-programming system 102, can resolve an edge from the list, or other container, of remaining edge(s) by the mechanism identifying a first node of a graph, such as node 202, having two ports, port A and port B. In this example, type states for the first node can be represented by [A=type1, B=type2] and [A=type3, B=type3]. In this example, the graph-based mechanism in the visual programming tool 126 can identify a second node of a graph, such as node 206, having two ports, port C and port D. In this example, type states for the second node can be represented by [C=type2, D=type1] and [C=type1, D=type2]. In this example, the graph-based mechanism in the visual programming tool 126 can identify an edge, such as edge 204, between these nodes connecting ports B and C. In this example, the graph-based mechanism in the visual programming tool 126 can resolve the edge by identifying valid types associated with the first node port B as first types (type2, type3), by identifying valid types associated with the second node port C as second types (type2, type1), and identify as reduced edge types the intersection of the first types and the second types (type2). In this example, the graph-based mechanism can cause the visual programming tool 126 to store, such as in datastore 106, first node type state(s) where the port B type is identified in the reduced edge types; in other words, where the port B type is type2 in this example, which means the graph-based mechanism would cause storage of the type state for the first node represented by [A=type1, B=type2] and remove the type state for the first node represented by [A=type3, B=type3]. In this example, the graph-based mechanism in the visual programming tool 126 can cause storage of the second node type state(s) where the port C type is identified in the reduced edge types; in other words, where the port C type is type2 in this example, which means the graph-based mechanism would cause storage of the type state for the second node represented by [C=type2, D=type1] and remove the type state for the second node represented by [C=type1, D=type2]. In this example, type1 can represent an int, type2 can represent a float, and type3 can represent a bool; many more types and any combination of types are supported.

At block 510, the mechanism associated with the graph-based visual-programming tool, such as visual-programming tool 126 associated with the visual-programming system 102, can determine whether the first node (e.g., node 202) reduced. In the example described above, the first node (e.g., node 202) reduced to type state [A=type1, B=type2].

At block 512, since the first node reduced, the mechanism associated with the graph-based visual-programming tool, such as visual-programming tool 126 associated with the visual-programming system 102, can add edge(s) connected to the first node to the list, or other container, of remaining nodes. If the first node had not reduced, the mechanism could skip the act associated with block 512.

At block 514, the mechanism associated with the graph-based visual-programming tool, such as visual-programming tool 126 associated with the visual-programming system 102, can determine whether the second node (e.g., node 206) reduced. In the example described above, the second node (e.g., node 206) reduced to type state [C=type2, D=type1].

At block 516, since the second node reduced, the mechanism associated with the graph-based visual-programming tool, such as visual-programming tool 126 associated with the visual-programming system 102, can add edge(s) connected to the second node to the list, or other container, of remaining nodes. If the second node had not reduced, the mechanism could skip the act associated with block 516.

At block 518, the mechanism associated with the graph-based visual-programming tool, such as visual-programming tool 126 associated with the visual-programming system 102, can determine whether the list, or other container, of remaining edge(s) is empty. When the list, or other container, of remaining edge(s) is not empty, the mechanism associated with the graph-based visual-programming tool, such as visual-programming tool 126 associated with the visual-programming system 102, can return processing to block 506 to process the remaining edge(s). When the list, or other container, of remaining edge(s) is determined to be empty at block 518, the mechanism can cause processing to proceed to block 520.

At block 520, when the list, or other container, of remaining edge(s) is determined to be empty at block 518 the mechanism associated with the graph-based visual-programming tool, such as visual-programming tool 126 associated with the visual-programming system 102, can provide the reduced type(s) for storage and/or for use by a program associated with the graph.

In various examples, for graphs of thousands to tens of thousands of nodes, the list will reduce to a subset of a few nodes within milliseconds, e.g., 20 milliseconds or less, which is not humanly perceptible.

Figure 6:
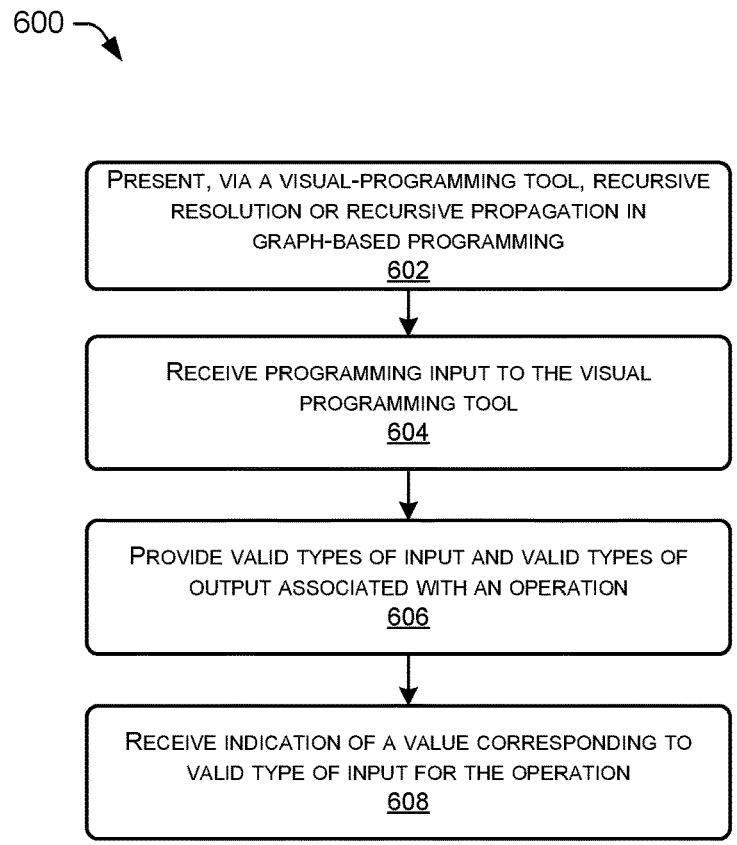
FIG. 6 illustrates a flow diagram of an example method of propagating and resolving information in graph-based programming languages as described herein.

FIG. 6 illustrates a flow diagram of an example method 600 of propagating and resolving information in graph-based programming languages as described herein.

Method 600 can include operation of a graph-based mechanism in a visual-programming tool 126 that is associated with a graphical-user interface and an input interface associated with visual-programming system 102. The visual programming tool can be used by a plurality of programmers/developers 104.

At block 602, the mechanism associated with the graph-based visual-programming tool, such as visual-programming tool 126 associated with the visual-programming system 102, can present, via a graphical-user interface, at least one of recursive resolution or recursive propagation in graph-based programming.

At block 604, the mechanism associated with the graph-based visual-programming tool, such as visual-programming tool 126 associated with the visual-programming system 102, can receive an input associated with a development program, e.g., a new program, a new game, a program update, a game update, etc. via an input interface. For example, the visual-programming tool 126 can receive an input such as a hover, right click, etc. over node 206.

At block 606, the mechanism associated with the graph-based visual-programming tool, such as visual-programming tool 126 associated with the visual-programming system 102, responsive to receiving input associated with an operation via the input interface, can configure the graphical-user interface to present valid types of input and/or valid types of output associated with the operation in a context of the programming input received. For example, the mechanism can cause the visual-programming tool 126 to present a pop-up box associated with the input port of node 206 listing the currently valid types of input and/or a pop-up box associated with the output port of node 206 listing the currently valid types of output.

At block 608, the mechanism associated with the graph-based visual-programming tool, such as visual-programming tool 126 associated with the visual-programming system 102, can receive an indication of a value corresponding to a valid type of the valid types of input for the operation. For example, via an associated input interface the visual-programming tool 126 can receive an angle value associated with the input port of node 206.

It should be noted that some of the operations of methods 300, 400, 500, or 600 can be performed out of the order presented, with additional elements, and/or without some elements. Some of the operations of methods 300, 400, 500, or 600 can further take place substantially concurrently and, therefore, may conclude in an order different from the order of operations shown above. Further, implementations are not limited to the details of the above examples and variations are possible.

Figure 7:
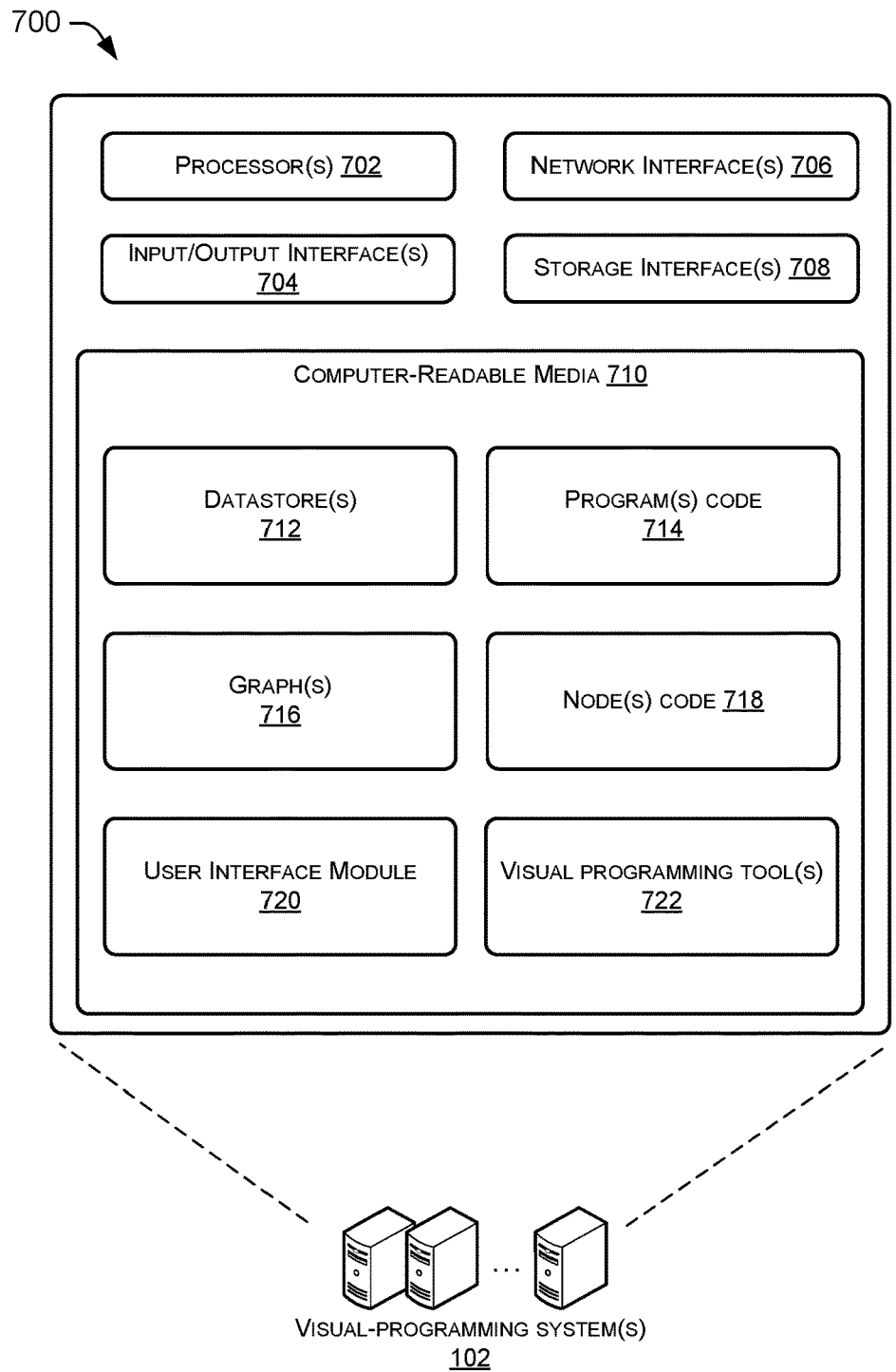
FIG. 7 illustrates a block diagram of an example visual-programming system that can implement a mechanism to propagate and resolve information in graph-based programming languages, in accordance with examples described herein.

FIG. 7 illustrates a block diagram of example computing device(s) 700 of visual-programming system(s) 102 that can implement a mechanism to propagate and resolve information in graph-based programming languages, in accordance with examples described herein.

The computing device(s) 700 can include one or more processor(s) 702, one or more input/output (I/O) interface(s) 704, one or more network interface(s) 706, one or more storage interface(s) 708, and computer-readable media 710.

In various examples, the processors(s) 702 can include one or more of a central processing unit (CPU), a graphics processing unit (GPU), a microprocessor, a digital signal processor, and/or other processing units or components. Alternatively, or in addition, the processing described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each processor(s) 702 can possess its own local memory, which also can store programs, program data, and/or one or more operating systems. Furthermore, the one or more processor(s) 702 can include one or more cores.

The one or more input/output (I/O) interface(s) 704 can enable the computing device(s) 600 of visual-programming system(s) 102 to detect interaction with a programmer/developer 104 (user) and/or other computing system(s). The I/O interface(s) 704 can include a combination of hardware, software, and/or firmware and can include software drivers for enabling the operation of any variety of I/O device(s) integrated on the computing device(s) 600 of visual-programming system(s) 102 or with which computing device(s) 600 of visual-programming system(s) 102 interact, such as displays, microphones, mouse-input devices, pen-input devices or touch-input devices, speakers, cameras, switches, and any other variety of sensors, or the like. In various examples, the I/O devices of the computing device(s) 600 of visual-programming system(s) 102 can include touch, audio, video, and/or other input functionality.

The network interface(s) 706 can enable the computing device(s) 600 of visual-programming system(s) 102 to communicate via the one or more network(s). The network interface(s) 706 can include a combination of hardware, software, and/or firmware and can include software drivers for enabling any variety of protocol-based communications, and any variety of wireline and/or wireless ports/antennas. For example, the network interface(s) 706 can include one or more of a cellular radio, a wireless (e.g., IEEE 802.1x-based) interface, a Bluetooth® interface, and the like. In some examples, the network interface(s) 706 can connect to the Internet. The network interface(s) 706 can further enable the computing device(s) 600 of visual-programming system(s) 102 to communicate over circuit-switch domains and/or packet-switch domains.

The storage interface(s) 708 can enable the processor(s) 702 to interface and exchange data with computer-readable media 710, as well as any storage device(s) external to the computing device(s) 600 of visual-programming system(s) 102, such as if datastore 106 is implemented in separate computing device(s) associated with machine-vision system(s) 102. The storage interface(s) 708 can further enable access to removable media.

The computer-readable media 710 can include volatile and/or nonvolatile memory, removable and non-removable media implemented in any method or technology for storage of information, such as computer-readable instructions, data structures, program functions, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 710 can be implemented as computer-readable storage media (CRSM), which may be any available physical media accessible by the processor(s) 1002 to execute instructions stored on the computer-readable media 710. In one implementation, CRSM can include random access memory (RAM) and Flash memory. In some implementations, CRSM can include, but is not limited to, read-only memory (ROM), electrically erasable programmable read-only memory (EEPROM), or any other tangible medium which can be used to store the desired information, and which can be accessed by the processor(s) 702. The computer-readable media 710 can have an operating system (OS) and/or a variety of suitable applications stored thereon. The OS, when executed by the processor(s) 702 can enable management of hardware and/or software resources of the computing device(s) 600 of visual-programing system(s) 102.

Several functional blocks having instruction, data stores, and so forth can be stored within the computer-readable media 710 and configured to execute on the processor(s) 702. The computer-readable media 710 can have stored thereon a datastore(s) 712, which can correspond to datastore 106, program code(s) 714, which can correspond to program(s) 108, graph(s) 716, which can correspond to graphs 110, node(s) 718, which can correspond to operations node-1 112 through node-n 122, user interface module 720, visual-programming tools 722, which can correspond to a graph-based mechanism in visual-programming tool 126 and/or any number and/or type of associated visual-programming tools. It will be appreciated that each of the blocks 712, 714, 716, 718, 720, and 722 can have instructions stored thereon that when executed by the processor(s) 702 enable various functions pertaining to the operations of the computing device(s) 700 of visual-programming system (s) 102. It should further be noted that one or more of the functions associated with blocks 712, 714, 716, 718, 720, and 722 can operate separately or in conjunction with each other.

The instructions stored in datastore(s) 712, when executed by processor(s) 702, can configure computing device(s) 700 of visual-programming system(s) 102 to allow visual-programming tools 126, 722 to access existing program(s), which can be represented as graphs of nodes and attributes of associated program(s), (e.g., games), including operations node data, connection data, (e.g., types of input, output, and/or units), and/or heuristics data, etc.

The instructions stored in program(s) code 714, when executed by processor(s) 702, can configure computing device(s) 700 of visual-programming system(s) 102 to allow visual-programming tools 126, 722 to access and analyze existing program(s), which can be represented as graphs and attributes of associated program(s), (e.g., games), including node data, connection data, (e.g., types of input, output, and/or units), and/or heuristics data, etc.

The instructions stored in graph(s) 716, when executed by processor(s) 702, can configure computing device(s) 700 of visual-programming system(s) 102 to allow visual-programming tools 126/722 to traverse graphs according to attributes of associated program(s), (e.g., games), including node data, connection data, (e.g., types of input, output, and/or units), and/or heuristics data, etc.

The instructions stored in operations node(s) code 718, when executed by processor(s) 702, can configure computing device(s) 700 of visual-programming system(s) 102 to allow visual-programming tools 126, 722 to access attributes of programs (e.g., games), including node data, connection data, (e.g., types of input, output, and/or units), and/or heuristics data, etc.

The instructions stored in user-interface module 720, when executed by computing device(s) 700, can configure computing device(s) of visual-programming system(s) 102 to allow visual-programming tools 126, 722 to receive user input associated with graph-based programming and provide information about operations node(s), connection/edge types, (e.g., types of input, types of output, and/or units), and/or heuristics data The instructions stored in visual-programming tool(s) 722, when executed by processor(s) 702, can configure computing device(s) 700 of visual-programming system(s) 102 to provide a mechanism and/or options for information propagation and resolution in graph-based programming in a visual programming environment.

The illustrated aspects of the claimed subject matter can be practiced in distributed computing environments where certain tasks are performed by remote processing devices that are linked through a communications network. In a distributed computing environment, program functions can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to examples of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams need not necessarily be performed in the order presented or need not necessarily be performed at all, according to some examples of the disclosure.

Computer-executable program instructions can be loaded onto a general purpose computer, a special-purpose computer, a processor, or other programmable data processing apparatus to produce a particular machine, such that the instructions that execute on the computer, processor, or other programmable data processing apparatus implement one or more functions specified in the flowchart block or blocks. These computer-program instructions can also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. Examples of the disclosure provide for a computer program product, comprising a computer usable medium having a computer-readable program code or program instructions embodied therein, the computer-readable program code adapted to be executed to implement one or more functions specified in the flow diagram block or blocks. The computer-program instructions can also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database can be transmitted to a centralized database capable of receiving data, information, or data records from more than one database or other data storage devices. In some embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims. Although specific terms are employed herein, they are used in a generic and descriptive sense only and not for purposes of limitation unless specifically defined herein.

What is claimed is:

1. A system comprising:
   one or more processors;
   one or more computer-readable media storing computer-executable instructions that, when executed by the one or more processors, configure the system to perform actions comprising:
   processing nodes of a directed graph in the system by:
      determining an operation category associated with a first node in the directed graph;
      resolving the first node as part of a pair of nodes including the first node and a second node based on the pair of nodes being associated with a shared operation category by actions that follow;
         a) identifying valid types of input associated with the first node;
         b) identifying valid types of output associated with the first node;
         c) identifying valid types of input associated with the second node of the pair of nodes;
         d) identifying valid types of output associated with the second node of the pair of nodes;
         e) reducing the valid types of input to an intersection of the valid types of output associated with the first node and the valid types of input associated with the second node;

f) storing, as reduced valid types of input associated with each node of the pair of nodes, the valid types of input included in the intersection of the valid types of input; and g) when additional nodes are associated with the shared operation category, repeating actions a to f for the additional nodes;

repeating the resolving and actions a to g for any pairs of nodes having a different shared operation category; and repeating the processing with the reduced valid types of input that are stored until the valid types of input no longer reduce.

2. The system of claim 1, the one or more computer-readable media storing computer-executable instructions that, when executed by the one or more processors, configure the system to perform the processing during use of the system.

3. The system of claim 1, the one or more computer-readable media storing computer-executable instructions that, when executed by the one or more processors, configure the system to perform actions further comprising determining an operation from the operation category for execution based on an input value.

4. The system of claim 1, the one or more computer-readable media storing computer-executable instructions that, when executed by the one or more processors, configure the system to perform actions further comprising deferring type resolution until a corresponding subgraph is in use.

5. The system of claim 1, the one or more computer-readable media storing computer-executable instructions that, when executed by the one or more processors, configure the system to perform actions further comprising propagating information through the system.

6. The system of claim 5, wherein the information includes units associated with a port type.

7. The system of claim 1, the one or more computer-readable media storing computer-executable instructions that, when executed by the one or more processors, configure the system to perform at least one of recursive resolution or recursive propagation during use of the system without human-perceptible delay.

8. A method comprising:
processing nodes of a directed graph in a system by:
determining an operation category associated with a first node in the directed graph;
resolving the first node as part of a pair of nodes including the first node and a second node based on the pair of nodes being associated with a shared operation category by actions that follow;
a) identifying valid types of input associated with the first node;
b) identifying valid types of output associated with the first node;
c) identifying valid types of input associated with the second node of the pair of nodes;
d) identifying valid types of output associated with the second node of the pair of nodes;
e) reducing the valid types of input to an intersection of the valid types of output associated with the first node and the valid types of input associated with the second node;
f) storing, as reduced valid types of input associated with each node of the pair of nodes, the valid types of input included in the intersection of the valid types of input; and g) when additional nodes are associated with the shared operation category, repeating actions a to f for the additional nodes;

repeating the resolving and actions a to g for any pairs of nodes having a different shared operation category; and repeating the processing with the reduced valid types of input that are stored until the valid types of input no longer reduce.

9. The method of claim 8, further comprising performing the processing during use of the system.

10. The method of claim 8, further comprising determining an operation from the operation category for execution based on an input value.

11. The method of claim 8, further comprising deferring type resolution until a corresponding subgraph is in use.

12. The method of claim 8, further comprising propagating information through the system.

13. The method of claim 12, wherein the information includes units associated with a port type.

14. The method of claim 8, further comprising performing at least one of recursive resolution or recursive propagation during use of the system without human-perceptible delay.

15. A non-transitory computer readable media comprising:
one or more computer-executable instructions that, when executed by one or more processors, configure a system to perform actions comprising:
processing nodes of a directed graph in the system by:
determining an operation category associated with a first node in the directed graph;
resolving the first node as part of a pair of nodes including the first node and a second node based on the pair of nodes being associated with a shared operation category by actions that follow;
a) identifying valid types of input associated with the first node;
b) identifying valid types of output associated with the first node;
c) identifying valid types of input associated with the second node of the pair of nodes;
d) identifying valid types of output associated with the second node of the pair of nodes;
e) reducing the valid types of input to an intersection of the valid types of output associated with the first node and the valid types of input associated with the second node;
f) storing, as reduced valid types of input associated with each node of the pair of nodes, the valid types of input included in the intersection of the valid types of input; and
g) when additional nodes are associated with the shared operation category, repeating actions a to f for the additional nodes;
repeating the resolving and actions a to g for any pairs of nodes having a different shared operation category; and
repeating the processing with the reduced valid types of input that are stored until the valid types of input no longer reduce.

16. The non-transitory computer readable media of claim 15, the one or more computer-executable instructions that, when executed by the one or more processors, configure the system to perform the processing during use of the system.

17. The non-transitory computer readable media of claim 15, the one or more computer-executable instructions that, when executed by the one or more processors, configure the system to perform actions further comprising at least one of determining an operation from the operation category for execution based on an input value, or deferring type resolution until a corresponding subgraph is in use.

18. The non-transitory computer readable media of claim 15, the one or more computer-readable media storing computer-executable instructions that, when executed by the one or more processors, configure the system to perform actions further comprising propagating information through the system.

19. The non-transitory computer readable media of claim 18, wherein the information includes units associated with a port type.

20. The non-transitory computer readable media of claim 15, the one or more computer-readable media storing computer-executable instructions that, when executed by the one or more processors, configure the system to perform at least one of recursive resolution or recursive propagation during use of the system without human-perceptible delay.

* * * * *